310-369 SR

XR 3,562,764

SEARCH ROOM 3,562,764

Filed Oct. 25, 1968

3 Sheets-Sheet 1

INVENTOR

SATORU FUJISHIMA

BY Wenderoth, Lind & Ponack

ATTORNEY

Feb. 9, 1971 SATORU FUJISHIMA 3,562,764

ANNULAR TYPE CERAMIC FILTER DEVICE

Filed Oct. 25, 1968 3 Sheets-Sheet 2

INVENTOR
SATORU FUJISHIMA

BY Wenderoth, Lind & Ponack

ATTORNEY

INVENTOR

SATORU FUJISHIMA

BY Wenderoth, Lind & Ponack

ATTORNEY

United States Patent Office 3,562,764

Patented Feb. 9, 1971

3,562,764

ANNULAR TYPE CERAMIC FILTER DEVICE

Satoru Fujishima, Kyoto-fu, Japan, assignor to Murata Manufacturing Co., Ltd., Kyoto-fu, Japan Filed Oct. 25, 1968, Ser. No. 770,701
Int. Cl. H01v 7/00
U.S. Cl. 310—9.4 3 Claims

ABSTRACT OF THE DISCLOSURE

An annular type ceramic filter device. An annular piezoelectric ceramic resonator vibrating in the circular vibration mode has two terminal electrodes on opposite circuits. A lower housing has a supporting member therein supporting the resonator at the central aperture thereof. Inner lead wires extend from the electrodes to the lower housing and then to external lead wires extending from the outside of the wall of the housing. An upper housing covers the lower housing.

This invention relates to an annular type ceramic filter device having an annular-shaped piezoelectric ceramic resonator, and more particularly to a ceramic filter which has few spurious signal characteristics, is very stable both mechanically and electrically, and is capable of being easily mounted on a hybrid substrate or the like.

Among the disadvantages of conventional type ceramic filter devices, as more particularly explained hereinafter with reference to the drawings, are that the electrical characteristics become worse the more stress is put on the mechanical support for the resonator, and that the mechanical support weakens when higher electrical stresses are placed on them. Another disadvantage is that they cannot be inserted into a hybrid integrated circuit because it is constructed so as to be positioned vertically of a circuit carrying base.

It is therefore an object of the present invention to provide an annular type ceramic filter device which is comprised of a resonator with an annular-shaped piezoelectric ceramic vibrator vibrating in the circular vibration mode and producing few spurious signals.

It is another object of the present invention to provide various supporting means for the resonator which can support the resonator perfectly both mechanically and electrically without disturbing the vibration characteristics thereof.

It is a further object of the present invention to provide an annular type ceramic filter device which is constructed so that it can be inserted in a hybrid integrated circuit.

It is still another object of the present invention to provide an annular type ceramic filter device which has a simple structure with only a few parts and is easy to mass produce at a minimum cost.

The foregoing and other objects, features and advantages of the present invention will be apparent from the following more particular description of the invention, taken together with the accompanying drawings, in which:

FIGS. 1A–1C show configurations of conventional ceramic filter devices provided with a disc-shaped piezoelectric ceramic resonator, FIG. 1A being an explanatory diagram of the radial expansion mode of vibration for a conventional disc-shaped piezoelectric resonator, FIG. 1B being a perspective view of a three terminal disc shaped ceramic resonator, and FIG. 1C being an exploded perspective view of a two terminal ceramic filter having the resonator mounted by a wire-mounting method;

FIGS. 2A–2C show configurations of conventional ceramic filter devices provided with a square-shaped piezoelectric resonator, FIG. 2A being an explanatory diagram of the area expansion mode of vibration for a square-shaped piezoelectric resonator, FIG. 2B being a perspective view of a three terminal ceramic resonator, and FIG. 2C being an exploded perspective view of a two terminal ceramic filter in which the resonator is mounted by a metal-contacting method;

FIGS. 3A–3F show a variety of configurations and arrangements of annular-shaped piezoelectric-ceramic resonators employed in the present invention, FIG. 3A being an explanatory diagram of the annular vibration mode of an annular-shaped piezoelectric-ceramic resonator, FIG. 3B being a perspective view of a two terminal ceramic resonator, FIG. 3C being a perspective view of a three terminal ceramic resonator, FIG. 3D being a perspective view of a three terminal ceramic resonator, FIG. 3E being a perspective view of another three terminal ceramic resonator, and FIG. 3F being a schematic diagram of a mutually coupled ceramic filter;

Figure 1A:
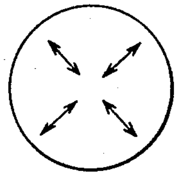
Fig. 1A (Prior Art)
Figure 1B:
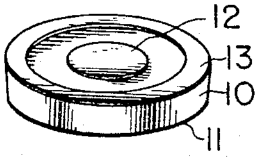
Fig. 1B (Prior Art)

Referring to FIGS. 1A and 1B, one type of conventional disc shaped piezoelectric resonator utilizing the radial expansion mode of vibration as indicated by the arrows in FIG. 1A, is constructed as shown in FIG. 1B. A surface electrode 11 covers one whole surface of a ceramic disc 10, and a small circular central electrode 12 and a ring-shaped outer electrode 13 are positioned coaxially on the opposite surface of disc 10.

Figure 2A:
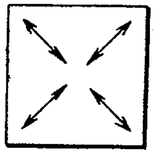
Fig. 2A (Prior Art)
Figure 2B:
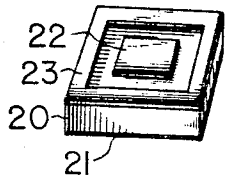
Fig. 2B (Prior Art)

FIGS. 2A and 2B show another type of conventional piezoelectric resonator. This is a square-shaped piezoelectric resonator utilizing the area expansion mode of vibration, as indicated by the arrows in FIG. 2A, and constructed as shown in FIG. 2B. A surface electrode 21 covers one whole surface of a ceramic plate 20, and a central electrode 22 and an outer electrode 23 are positioned coaxially on the opposite surface of plate 20.

The first described resonator utilizing the radial expansion mode of vibration of a disc has the second harmonic at a frequency about 2.3 times the fundamental resonant frequency, and the second described resonator utilizing the area expansion mode of vibration of a square plate has the second harmonic at a frequency of about 2.2 times the fundamental resonant frequency. When they are used in receivers, the ability of these resonators to pass only the desired frequency signals is reduced due to the influence of said second harmonics. Further, in said disc-shaped resonator and square-shaped resonator, there are always a few vibration nodes which cause various harmonics.

The resonant frequencies of the resonators of FIGS. 1A and 2A are given by the following equations, respectively:

$$f_n=\frac{\alpha n}{D}\sqrt{\frac{E}{\rho}} \quad (1)$$

$$f_n=\frac{\beta n}{l}\sqrt{\frac{E}{\rho}} \quad (2)$$

where,

E: Young's modulus of a ceramics
$\rho$: density of a ceramics
D: diameter of disc
$l$: length of a square plate
$n$: an integer of overtone Moreover, in above Equations 1 and 2, if the resonant frequency is $f_0$ and the first harmonic is $f_1$, the following relations are given:

$$\alpha_1 \doteqdot 2.3\alpha_0, \quad \alpha_2 \doteqdot 3.4\alpha_0 \quad \ldots \quad (3)$$

$$\beta_1 \doteqdot 2.2\beta_0, \quad \beta_2 \doteqdot 3.2\beta_0 \quad \ldots \quad (4)$$

These equations show the harmonic vibrations of a disc-shaped piezoelectric resonator and a square-shaped piezoelectric resonator respectively shown in FIGS. 1A and 2A.

Figure 3A:
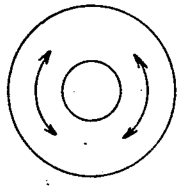

In the present invention an annular-shaped piezoelectric ceramic resonator is employed as shown in FIGS. 3B–3E, utilizing the annular vibration mode, as shown in FIG. 3A. There are no vibration nodes, and accordingly it can be concluded that harmonic vibrations do not exist even theoretically. Only spurious vibrations, due to such factors as the thickness or the width of the annular disc, exist. These spurious vibrations can be kept far from the fundamental resonant frequency of the annular vibration mode by making both the thickness and width of the annular disc smaller relative to the circumference.

In the annular-shaped piezoelectric ceramic resonator of the present invention, if the outer diameter is $a$ and the inner diameter is $b$, its resonant frequency ($f_0$) is given by the following equation:

$$f_0=\frac{2}{\pi(a+b)}\sqrt{\frac{E}{\rho}} \quad (5)$$

consequently, there is no harmonic frequency, only the resonant frequency ($f_0$).

Figure 1C:
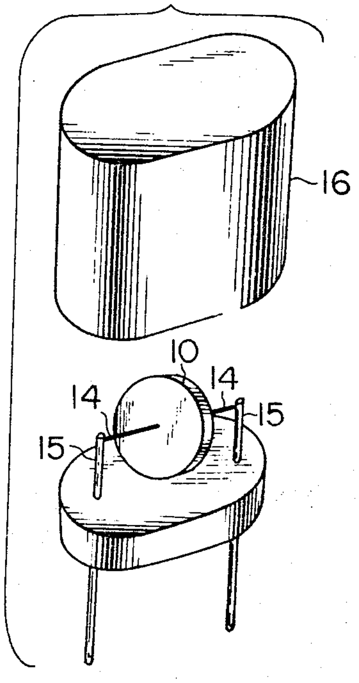
Fig. 1C (Prior Art)
Figure 2C:
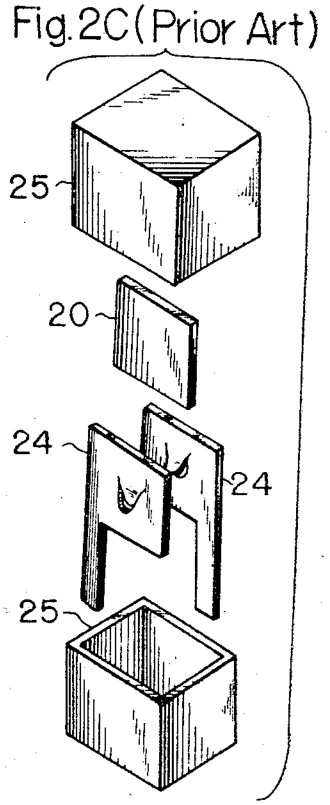
Fig. 2C (Prior Art)

In connection with the methods of supporting the resonators and the housings for the resonators of the conventional filter device, there is one type of ceramic filter called a wire-mounted filter which is shown in FIG. 1C, in which lead wires 14 are soldered to both surfaces of the disc-shaped resonator 10 and to stators 15, and all elements are encased in a housing 16. Another type of ceramic filter mounting is the so-called metal-contact mounting shown in FIG. 2C in which a square resonator 20 is supported between metal plates 24 having points thereon for engaging the resonator, and all elements are encased in a housing 25.

However, when these types of mountings are used, the electrical characteristics of said conventional type ceramic filter devices deteriorate when stress is put on the mechanical support of the resonator, and the mechanical support deteriorates when electrical stress is put on it.

Further, these conventional type ceramic filter devices have the disadvantages that they cannot be inserted in a hybrid integrated circuit because they are vertically positioned with respect to the housing base.

The present invention overcomes the disadvantages of the above mentioned conventional type ceramic filter and providing an annular type ceramic filter which is capable of being easily adapted to a hybrid substrate and the like.

Figure 3B:
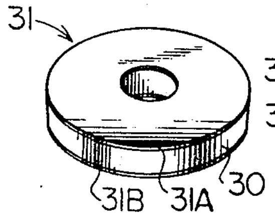

Referring now to the drawings, FIG. 3B shows a two terminal resonator 31 having electrodes 31A and 31B on opposite surfaces of a polarized annular ceramic base 30 made of piezoelectric ceramic material such as lead-zirconate-titanate.

Figure 3C:
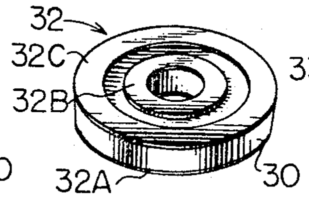

FIG. 3C shows a three terminal resonator 32 provided with electrode 32A on one surface, and a pair of concentric electrodes 32B and 32C on the opposite surface of a polarized annular base 30 made of piezoelectric ceramic material.

Figure 3D:
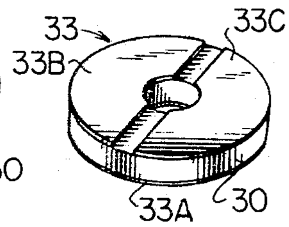

FIG. 3D shows a three terminal resonator 33 provided with an electrode 33A on one surface and a pair of semi-circular electrodes 33B and 33C on the opposite surface of the polarized annular ceramic base 30 made of piezoelectric ceramic material.

Figure 3E:
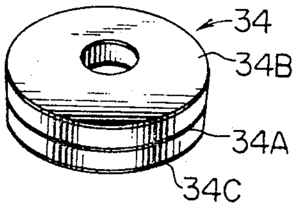

FIG. 3E illustrates a three terminal resonator 34 which is a laminated resonator, in which 34A is a center electrode, and 34B and 34C are outer electrodes respectively.

Figure 3F:
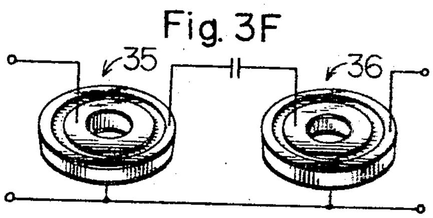
Figure 9:
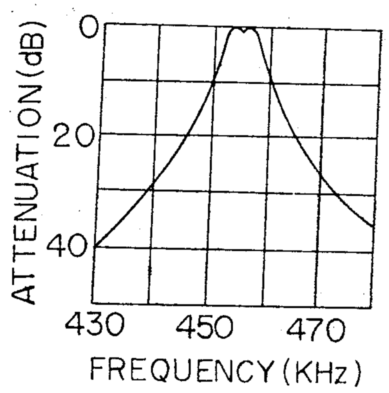
FIG. 9 is a graph showing the frequency characteristics of the mutually coupled filter shown in FIG. 3F.

FIG. 3F shows a mutually coupled ceramic filter having high sensitivity, which is made by electrically coupling two resonators of the type shown in FIG. 3C in series with a capacitance of 100 pf. between the output terminal of the first resonator 35 and the input terminal of the second resonator 36. A double peak frequency characteristic of about 6 kHz. band width as plotted in FIG. 9 can be obtained with this filter.

Figure 8:
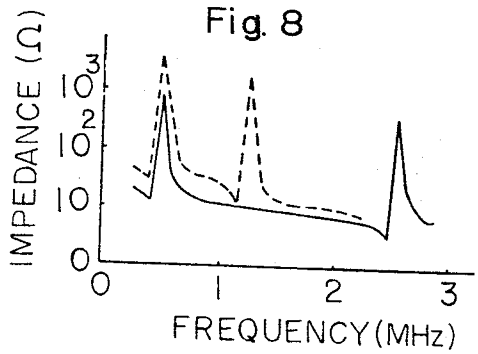
FIG. 8 is a graph showing the impedance characteristics of the ceramic filter of this invention as shown in FIG. 3 as compared to those of the conventional resonators shown in FIGS. 1 and 2.

A specific embodiment of the annular piezoelectric resonator in accordance with this invention of the type shown in FIG. 3B can be made of lead-zirconate-titanate ceramic material, which has a 1.5 mm. inner diameter, a 3.5 mm. outer diameter and a 0.3 mm. thickness, and electrodes on each surface. The fundamental resonant frequency is about 455 kHz., the impedance characteristic of which is shown by the unbroken line in FIG. 8, wherein no higher harmonics exists throughout the entire range of 2.5 mHz. which is the width vibration of the resonator. Moreover, the dotted line in FIG. 8 shows the impedance characteristics of a conventional disc or square resonator as shown in FIGS. 1 and 2. It is seen that a second harmonic exists in the range of about 1.2 mHz. for the conventional type resonator, and thus the annular resonator has much better characteristics.

The supports and external housings for the annular resonators can be of several types.

As aforementioned, the annular-shaped piezoelectric ceramic resonator employed in this invention is characterized by having an aperture in the center of an ordinary ceramic disc so that the nodal point and any higher harmonics of mechanical vibration are eliminated.

There are three ways of supporting the resonator, through its central aperture, the opposite surfaces of the resonator, or the periphery. However, the first way is the best, because the others damp mechanical vibration of the resonator.

It is therefore the most desirable way of supporting the resonator to suport it at the central aperture, but even when this way is used, when the resonator is supported by a solid supporting member fixed to the internal edge of the resonator around the central aperture, the vibration of the resonator may be somewhat damped. When supporting the resonator at its central aperture, in order to keep the vibration characteristics good, a proper configuration or material for the supporting member must be used.

The supporting members in accordance with the present invention are constructed so as not to contact all of the internal surface of the annular disc around the aperture; that is, the supporting member contacts the aperture of the resonator through only one edge of the resonator, or a supporting member can contact the internal surface around the aperture at only a few points, or the supporting member can consist of such materials as a foamed resin or another soft material.

Figure 4A:
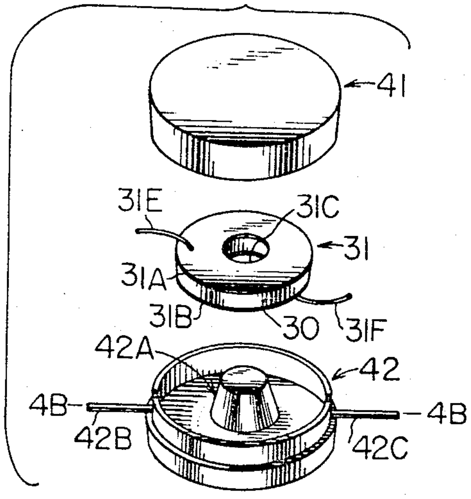
FIG. 4A is an exploded perspective view of one embodiment of an annular type ceramic filter according to the present invention.
Figure 4B:
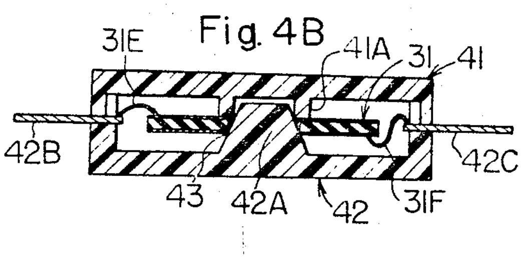
FIG. 4B is an enlarged cross-sectional view of the annular type ceramic filter of FIG. 4A in assembled form taken along the line 4B—4B of FIG. 4A.

FIGS. 4A and 4B illustrate one embodiment of an annular type ceramic filter device in accordance with this invention. The filter includes an upper housing 41, a two terminal resonator 31 of the type shown in FIG. 3B, and a lower housing 42.

The lower housing 42 has a truncated conical supporting member 42A at the center thereof and has outer lead wires 42B and 42C extending from the side wall thereof.

The upper housing 41 has an annular projecting portion 41A in the center thereof, the inner diameter of the annular projecting portion 41A being as shown in FIG. 4B, a little larger than the diameter of the top plane of the truncated conical supporting member 42A, and also the outer diameter of the annular projecting portion 41A is larger than the diameter of the aperture 31C of the two terminal annular ceramic resonator 31.

The two terminal annular resonator 31 has the lower edge of the aperture 31C contacting the conical surface 43 of the truncated conical supporting member 42A, and the upper surface of the resonator 31 is contacted by the annular projecting portion 41A of the upper housing 41. Consequently said resonator 31 is securely supported and securely accommodated within both the housings 41 and 42 without the support members contacting the inner surfaces thereof. Moreover, wire leads 31E and 31F attached to electrodes 31A and 31B of the resonator 31 are respectively connected to the outer lead wires 42B and 42C radially extending from the side wall of the lower housing 42.

The inner wire leads are connected by an ultrasonic bonding or other suitable means to the electrodes of the resonator and to the outer lead wires, respectively.

The present filter device has the advantage that the inner lead wires can block the passage of the mechanical vibration of the resonator to the outer lead wires without damping the mechanical vibration of the resonator. Furthermore, the electrical connection therebetween is not diminished.

Figure 5A:
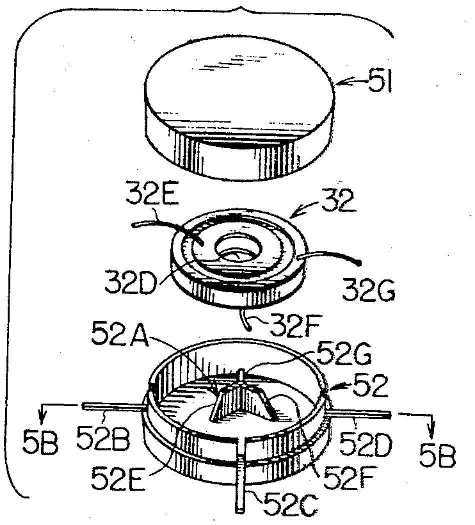
FIG. 5A is an exploded perspective view of another embodiment of an annular type ceramic filter according to the present invention.
Figure 5B:
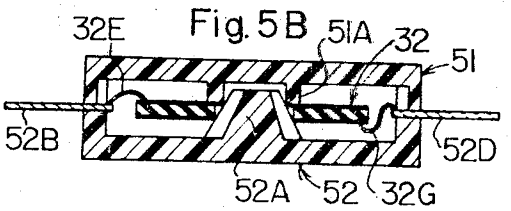
FIG. 5B is an enlarged cross-sectional view of the annular type ceramic filter of FIG. 5A in assembled form taken along the line 5B—5B of FIG. 5A.

FIGS. 5A and 5B illustrate another preferred embodiment of an annular type ceramic filter in accordance with this invention. The filter consists of an upper housing 51, a three terminal resonator 32 of the type shown in FIG. 3C; and a lower housing 52.

The lower housing 52 has a tapered three point contact type supporting member 52A at the center thereof and has outer lead wires 52B, 52C and 52D each extending radially from the side wall thereof.

The upper housing 51 has at its center an annular projecting portion 51A, which, as shown in FIG. 5B, fits around the tapered three point contact type supporting member 52A and has a larger outer diameter than an inner diameter of the aperture 32D in the center of the three terminal resonator 32.

The annular type ceramic filter device according to this embodiment has the three terminal annular resonator 32 supported on the tapered three point contact type supporting member 52A, and wire leads 32E, 32F and 32G attached to the respective electrode of the resonator 32 are respectively connected to the outer lead wires 52B, 52C and 52D. The upper housing 51 is mounted on the lower housing 52 with the resonator 32 interposed between the tapered three point contacts 52E, 52F, 52G and the lower end of the annular projecting portion 51A, thus being accommodated without contacting the inner surfaces of the housings 51 and 52.

In the embodiments of FIGS. 4A and 4B, and 5A and 5B the supporting member is integral with the lower housing.

Figure 6A:
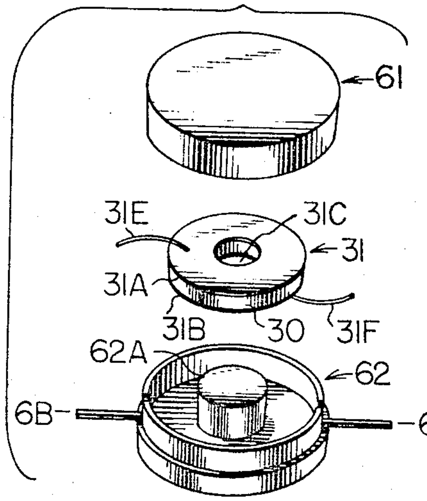
FIG. 6A is an exploded perspective view of still another embodiment of an annular type ceramic filter according to the present invention.
Figure 6B:
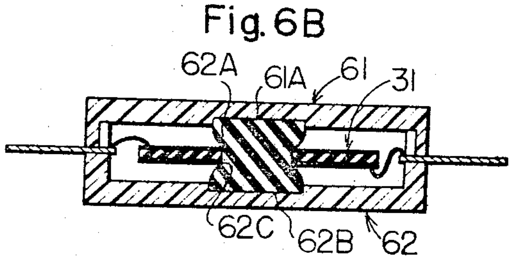
FIG. 6B is an enlarged cross-sectional view of the annular type ceramic filter of FIG. 6A in assembled form taken along the line 6B—6B of FIG. 6A.

FIGS. 6A and 6B illustrate another embodiment of an annular ceramic filter provided with a rod or supporting member 62A made of a flexible material such as silicone rubber, sponge rubber, polyurethane foam, felt or the like, and a lower housing 62 and an upper housing 61 which have respective recesses 62B and 61A at the centers thereof. The resonator 31 is supported at the middle portion 62C of the supporting member 62A, the member 62A filling the central aperture. The remainder of the housing structure and electrical leads are almost identical with those of FIGS. 4 and 5.

A specific embodiment of an annular ceramic filter device having a construction as shown in FIGS. 5A and 5B is as follows:

material of the housing: Bakelite
diameter of the housing: 6 mm.
thickness of the housing: 2 mm.
inner wire lead: gold, 20 microns in diameter
material of the resonator: lead-zirconate-titanate ceramic
resonant frequency of the resonator: 455 kHz.

Figure 7A:
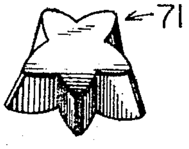
FIGS. 7A–7D are perspective views of various supporting members for the annular-shaped resonator.
Figure 7B:
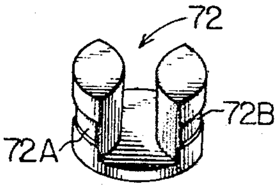
Figure 7C:
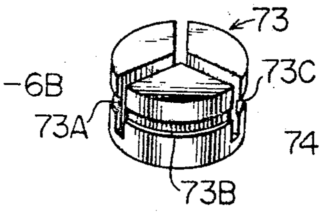
Figure 7D:
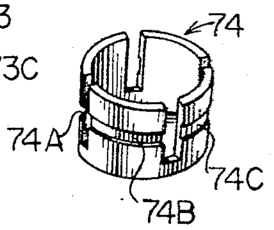

FIGS. 7A–7D illustrate various types of supporting members. A tapered five point contact type supporting member 71 shown in FIG. 7A is similar to the tapered three points contact type supporting member 52A of FIGS. 5A and 5B. A two linear contact type supporting member 72 of resilient material which supports the resonator in the recesses 72A and 72B by the elasticity of the member is shown in FIG. 7B. FIG. 7C shows a three linear contact type supporting member 73 of resilient material which supports the resonator in the recesses 73A, 73B and 73C by the elasticity of the member. A four linear contact type supporting member 74 of resilient material and formed in the shape of a split annular member is shown in FIG. 7D which supports the resonator in the recesses 74A, 74B, 74C and 74D by the elasticity of the member.

In the annular type ceramic filter using supporting members such as the members 72–74, the annular projecting portion on the upper housing, as shown in FIGS. 4B and 5B, can be omitted.

When said various shaped supporting members are used the resonator is supported by the action of the elasticity of the supporting members. In addition, it may be desirable to use a soft adhesive in some cases in order to secure the resonator to the supporting member.

Referring to the configurations of the supporting members for the annular piezoelectric ceramic resonator, some shapes and arrangements have been described in the drawings. Another type of supporting members can be used, which is capable of securing the resonator between the lower housing and the upper housing by the use of a point contact member having more than two point contacts, i.e., a supporting member which is composed of a regular polygonal pole, or a truncated regular polygonal pole which is provided with a plurality of contacting portions to support the resonator at the aperture therein.

The above described supporting members having a plurality of contacting portions can be further improved if they have grooves at the middle portions in which the aperture of the resonator is fixed.

Another type of supporting member which can be employed is a split pipe or a hook shaped member made of a flexible material.

Some preferred embodiments of the invention have been illustrated and described in detail. It is to be particularly understood that the invention is not limited thereto or thereby, and is capable of various changes and modifications without departing from the spirit and scope of the present invention as defined in the appended claims.

What is claimed is:

1. An annular type ceramic filter device comprising an annular piezoelectric ceramic resonator vibrating in the circular vibration mode and having an aperture in its center, the resonator being of a piezoelectric ceramic material annular member having at least two terminal electrodes, the electrodes being on opposite surfaces, a lower housing having a supporting member therein and having external lead wires extending from the outside of the wall of the housing, said supporting member having a plurality of tapered portions for supporting said resonator at the central aperture thereof, and inner lead wires electrically connecting said electrodes to said outer lead wires, and an upper housing covering said lower housing, said upper housing having a projecting portion therein opposite the supporting member, and the resonator being securely supported within the lower housing and the upper housing between the tapered portions of the supporting member and the projecting portion in the upper housing.

2. An annular type ceramic filter device comprising an annular piezoelectric ceramic resonator vibrating in the circular vibration mode and having an aperture in its center, the resonator being of a piezoelectric ceramic material annular member having at least two terminal electrodes, the electrodes being on opposite surfaces, a lower housing having a supporting member therein and having external lead wires extending from the outside of the wall of the housing, said supporting member having a truncated conical shape the middle portions of which engage the lower edge of the aperture of the resonator to thereby support said resonator, and inner lead wires electrically connecting said electrodes to said outer lead wires, and an upper housing covering said lower housing.

3. An annular type ceramic filter device comprising an annular piezoelectric ceramic resonator vibrating in the circular vibration mode and having an aperture in its center, the resonator being of a piezoelectric ceramic material annular member having at least two terminal electrodes, the electrodes being on opposite surfaces, a lower housing having a recess in the bottom thereof and a supporting member fixed in said recess and having external lead wires extending from the outside of the wall of the housing, said supporting member supporting said resonator at the central aperture thereof, and inner lead wires electrically connecting said electrodes to said outer lead wires, and an upper housing covering said lower housing, said supporting member being of an elastic material taken from the group consisting of silicone rubber, sponge rubber, polyurethane foam, and felt.

References Cited

UNITED STATES PATENTS

| | | | |
|---|---|---|---|
| 2,838,695 | 6/1958 | Thurston | 333—72(UX) |
| 3,176,251 | 3/1965 | Kuenig | 333—72 |
| 3,423,700 | 1/1969 | Curran et al. | 333—72 |

FOREIGN PATENTS

| | | | |
|---|---|---|---|
| 703,020 | 1/1954 | Great Britain | 333—72 |

HERMAN KARL SAALBACH, Primary Examiner

T. VEZEAU, Assistant Examiner

U.S. Cl. X.R.

310—9.6; 333—72